United States Patent [19]

Inoue

[11] 4,024,555

[45] May 17, 1977

[54] FOCAL PLANE SHUTTER FOR CAMERAS

[75] Inventor: Nobuyoshi Inoue, Kawagoe, Japan

[73] Assignee: Copal Company Limited, Tokyo, Japan

[22] Filed: Aug. 29, 1974

[21] Appl. No.: 501,617

[30] Foreign Application Priority Data

Aug. 31, 1973 Japan ............................. 48-97950
Mar. 11, 1974 Japan ............................. 49-27863

[52] U.S. Cl. ............................. 354/249; 354/246; 354/248
[51] Int. Cl.² ............................................. G03B 9/38
[58] Field of Search .......... 354/245, 246, 252, 247, 354/248, 249, 250

[56] References Cited

UNITED STATES PATENTS

| | | | |
|---|---|---|---|
| 3,078,776 | 2/1963 | Okabe | 354/246 |
| 3,391,627 | 7/1968 | Leuschke | 354/252 |
| 3,580,156 | 5/1971 | Loseries | 354/252 |
| 3,628,438 | 12/1971 | Loseries | 354/246 |
| 3,829,878 | 8/1974 | Onda et al. | 354/246 |
| 3,834,802 | 9/1974 | Kitai et al. | 354/246 |
| 3,842,429 | 10/1974 | Kitai et al. | 354/246 |
| 3,852,786 | 12/1974 | Onda et al. | 354/252 |
| 3,871,012 | 3/1975 | Haraguchi | 354/246 |

FOREIGN PATENTS OR APPLICATIONS

| | | | |
|---|---|---|---|
| 2,254,521 | 5/1974 | Germany | 354/249 |

*Primary Examiner*—Russell E. Adams, Jr.
*Attorney, Agent, or Firm*—Cushman, Darby & Cushman

[57] ABSTRACT

A focal plane shutter for cameras comprising two sets of shutter blades each of which comprises a plural number of opaque thin plates supported by two supporting arms, a partition plate for separating said two sets of shutter blades from each other, a pair of retaining plates for forming spaces between respective retaining plates and said partition plate for the purpose of housing said two sets of shutter blades separately from each other in said spaces, and an exposure aperture having opposing sides cut in a shallow V-shape. The overall size of said focal plane shutter small, and the shutter blades are moved smoothly at the time of operation without causing jamming or collision of the shutter blades.

3 Claims, 5 Drawing Figures

FOCAL PLANE SHUTTER FOR CAMERAS

BACKGROUND OF THE INVENTION a. Field of the Invention:

The present invention relates to a focal plane shutter for cameras and, more particularly, to a focal plane shutter having a plural number of shutter blades made of opaque thin plates, said intransparent thin plates being arranged to perform parallel motion by means of a pair of supporting arms in order to open and close an exposure aperture.

b. Description of the Prior Art:

Conventional shutters of this type are arranged as follows. That is, on a base plate having an exposure aperture, base portions of two supporting arms are pivotably mounted at one side of said exposure aperture. A thin plate is pivotably mounted to the free ends of said arms which extend to the other side of said exposure aperture, and said pivots are arranged so that line segments connecting said pivots will form a parallelogram. Said thin plate has dimensions sufficient to cover said exposure aperture. Shutters of the above-mentioned arrangement have various disadvantages for designing and manufacture because they are arranged so that said arms extend across the exposure aperture and said thin plate is supported by the free ends of said arms and is extended toward base portions of said arms so that said thin plate will cover the exposure aperture. For example, when a set of shutter blades is formed by dividing said thin plate into three pieces or more and by pivoting said respective pieces to two arms in the same way as mentioned in the above, the pivot pins for mounting one of the thin plates to the arms become obstacles for mounting the other thin plates. Therefore, a plural number of thin plates should be pivoted to both ends of the arms by turns. Besides, in practice, said arms have to support a plural number of thin plates by their portions for which the amount of movement is comparatively large and, moreover, for which the moving speed is high.

So, said arms should be made comparatively thick. Therefore, if thin plates are pivoted to both ends by turns as described in the above, there will occur a risk of light leakage. Consequently, when a set of shutter blades is arranged by three thin plates, the thin plate in the middle has been connected to arms through intermediate members in order to solve the above problem. In said connecting method, however, construction of the shutter becomes complicated and, moreover, the space occupied by the shutter blade when those thin plates are contracted becomes large because said intermediate members are mounted across said arms. As a result, the shutter as a whole becomes unnecessarily large.

Besides, this type of shutter has two sets of shutter blades comprising plural numbers of thin plates respectively pivoted to two arms as described above and is arranged to complete one exposing operation by opening and closing the exposure aperture as follows. That is, after one set of shutter blades is moved from the extended state to the contracted state, the other set of shutter blades is moved from the contracted state to the extended state. Consequently, at the end of exposing operation, the set of shutter blades operated later sometimes collides against the set of shutter blades which was operated first because of bounding. To prevent such problem, bent portions are provided for the respective main thin plates, which form the exposure slit, out of thin plates for two sets of shutter blades. However, these bent portions cause an increase of the working processes of the thin plates and, moreover, result in increased risk of leakage of light at the end of an exposure. Therefore, it is necessary to make said main thin plates large enough for closing the exposure aperture. As a result, the shutter blade as a whole becomes large and, consequently, the shutter mechanism as a whole also becomes large.

SUMMARY OF THE INVENTION

It is, therefore, a primary object of the present invention to provide a focal plane shutter of the above-mentioned type, the shutter as a whole being arranged extremely small and compact and the shutter being arranged to completely avoid the risk of collision of shutter blades even when the shutter blades themselves are not subjected to any special working process.

Another object of the present invention is to provide a focal plane shutter having an extremely high durability and high performance in spite of light weight and capable of completely prevent leakage of light.

Still another object of the present invention is to provide a focal plane shutter of simple construction which can be designed easily.

Objects of the present invention can be attained by arranging the shutter as follows. That is, out of a plural number of opaque thin plates which are to constitute the shutter blades, the main thin plate serving to form the exposure slit is supported by free end portions of two arms by putting the end portion of said main plate, which is near the pivoting points of said two arms, adjacent to said arms. The remaining thin plates are respectively supported by said two arms in such state that said remaining thin plates are put upon said main thin plate in turn and respective end portions of said remaining thin plates are connected to said arms at positions on said arms nearer the pivoting points of said arms in turn.

One of two sets of shutter blades is mounted to the base plate so that it has a relation of a mirror image in respect to the other set of shutter blades and respective supporting arms are operated in different planes which are spaced from each other.

The two sets of shutter blades are separated from each other by means of a partition plate, thus said two sets of shutter blades are prevented from colliding against each other. Besides, opposing sides of an aperture formed in said partition plate are cut to form shallow V-shapes so that respective shutter blades can be moved smoothly.

On both sides of said partition plates, a pair of retaining plates is mounted in inclined state, free ends of respective shutter blades being housed in spaces respectively formed by said partition plate and retaining plates and having wedge-like sectional areas, the shutter blades being thereby capable of performing stable movement.

Other objects as well as the attendant advantages of the present invention will become apparent from the following detailed description of the preferred embodiment when taken in conjunction with the accompanying drawings.

DETAILED DESCRIPTION OF THE PREFERRED EMBODIMENT

Accompanying drawings show an embodiment of the focal plane shutter in which two sets of shutter blades respectively comprises three opaque thin plates.

Figure 4:
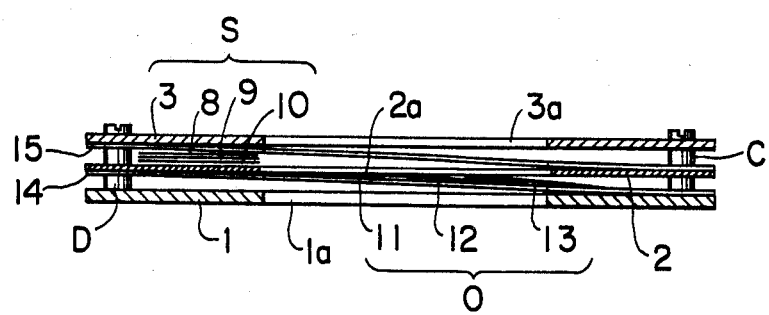
FIG. 4 shows a sectional view taken along the line IV — IV in FIG. 1.
Figure 5:
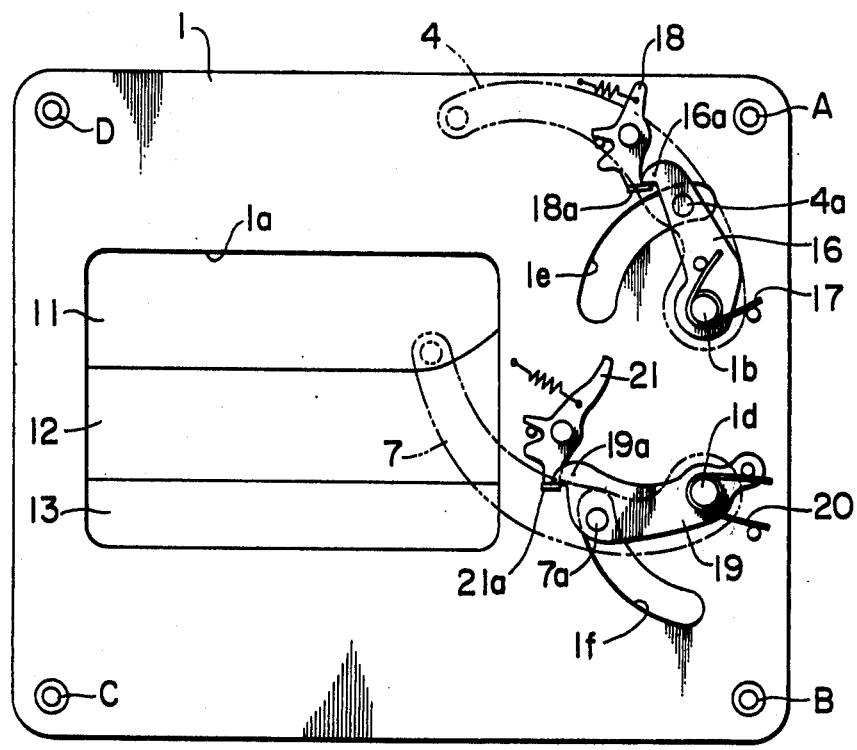
FIg. 5 shows a rear view of the embodiment shown in FIG. 1 where a shutter actuating mechanism is added.

In the respective figures, numeral 1 designates a base plate having an exposure aperture 1a. Numeral 2 designates a partition plate mounted integrally to the base plate by columns C and D leaving a slight space between said base plate 1 and partition plate 2. The partition plate 2 has an aperture 2a having the same size as the exposure aperture 1a but having two opposing longer sides 2b and 2c respectively bowed outward forming shallow V-Shapes. Numeral 3 designates a cover plate mounted integrally to the base plate by columns A, B, C and D leaving a slight space from the partition plate 2. The cover plate 3 has an aperture 3a of the same shape as the exposure aperture 1a. The base plate 1 and cover plate 3 are substantially of the same shape, the space between the base plate 1 and partition plate 2 is equal to the space between said partition plate 2 and cover plate 3, and the exposure aperture 1a is aligned with apertures 2a and 3a. Numerals 4 and 5 designate a pair of supporting arms, said supporting arms 4 and 5 being respectively pivoted to the base plate 1 by shafts 1b and 1c and being biased clockwise by a method described later. Numerals 6 and 7 designate a pair of supporting arms, said suppoting arms 6 and 7 being respectively pivoted to the base plate 1 by shafts 1c and 1d and being biased clockwise by a method described later. Numerals 8, 9 and 10 respectively designate opaque thin plates made of metal or hard plastics and respectively pivoted to supporting arms 4 and 5 by three pairs of pins 8a and 8b, 9a and 9b, and 10a and 10b. Numerals 11, 12 and 13 respectively designate opaque thin plates made of metal or hard plastics and respectively pivoted to supporting arms 6 and 7 by three pairs of pins 11a and 11b, 12a and 12b, and 13a and 13b. As it is evident from drawings, supporting arms 4 and 7 and supporting arms 5 and 6 are arranged respectively in the relation of mirror images in respect to each other, i.e., in the relation that one of them is put upside down. Besides, said arms 4 and 5 and arms 6 and 7 are arranged to move in two different plates which are spaced from each other. Shafts 1b, 1c and 1d are arranged on a straight line which is in parallel with shorter sides of the exposure aperture 1a. All of intransparent thin plates 8, 9 and 10 and intransparent thin plates 11, 12 and 13 are substantially of rectangular shape of a size sufficient for covering the exposure aperture 1a. Pins 8a and 8b, 9a and 9b, and 10a and 10b and pins 11a and 11b, 12a and 12b, and 13a and 13b for pivoting said thin plates to respective supporting arms are all arranged at end portions of respective thin plates, i.e., at end portions on the side near pivot pins 1b, 1c and 1d of supporting arms. Moreover, line segments connecting those pins are all equal to each other and are in relation that said line segments can constitute respective sides of parallelograms. Intransparent thin plates 8, 9 and 10 are mounted so that one is put upon another as shown in FIG. 5. Especially, the main thin plate 8, which serves for forming the exposure slit, is connected to supporting arms 4 and 5 at free ends of said supporting arms 4 and 5 and on the side nearest said supporting arms 4 and 5. The other thin plates 9 and 10 are arranged in turn below the main thin plate 8. Amount of mutual overlapping of these thin plates 8, 9 and 10 becomes the largest when they are at the contracted position shown in FIG. 1, and becomes the smallest when they are at the extended position shown in FIG. 3. Thus, said thin plates 8, 9 and 10 constitute closing shutter blades S. Opaque thin plates 11, 12 and 13 are respectively mounted to supporting arms 6 and 7 in the relation of mirror images in respect to opaque thin plates 8, 9 and 10. That is, the main thin plate 11 is connected to supporting arms 6 and 7 at the free ends of respective supporting arms 6 and 7 and on the side nearest said supporting arms 6 and 7. The other thin plates 12 and 13 are arranged in turn on the main thin plate 11. Especially, the main thin plate 11 serves to form the exposure slit by cooperating with the main thin plate 8. Amount of mutual overlapping of these thin plates 11, 12 and 13 becomes the smallest when they are in the extended position shown in FIG. 1 and becomes the largest when they are in the contracted position shown in FIG. 3. Thus, said thin plates 11, 12 and 13 constitute opening shutter blades O. Numeral 14 designates a retaining plate mounted in the space formed by the base plate 1 and partition plate 2 as clearly shown in FIG. 4, said retaining plate 14 being mounted in the inclined state by means of columns C and D. Numeral 15 designates a retaining plate mounted in the space formed by the partition plate 2 and cover plate 3 as clearly shown in FIG. 4, said retaining plate 15 being mounted in the inclined state by means of columns C and D. As it is evident from FIG. 1 through FIG. 3, it is evident that said retaining plates 14 and 15 are of the same shape having a side which is capable of aligning with the shorter side of the exposure aperture 1a. Besides, said retaining plates 14 and 15 have such shape which is capable of respectively covering the free ends of thin plates 8, 9 and 10 and thin plates 11, 12 and 13. The wedge-shaped spaced formed by the retaining plate 14 and partition plate 2 (FIG. 4) is arranged so that said space becomes small at the position occupied by the main thin plate 11 when the opening shutter blades O are extended to cover the exposure aperture 1a (FIG. 1) and becomes large at the position occupied by said main thin plate 11 when the opening shutter blades O are in the contracted state (FIG. 2 and FIG. 3) retracting from the exposure aperture 1a. The wedge-like space formed by the partition plate 2 and retaining plate 15 (FIG. 4) is arranged so that said space becomes large at the position occupied by the main thin plate 8 when the closing shutter blades S are in the contracted state (FIG. 1 and FIG. 2) by retracting from the exposure aperture 1a and becomes small at the position occupied by the main thin plate 8 when the closing shutter blades S are extended to cover the exposure aperture 1a (FIG. 3). Numeral 16 designates an actuating lever rotatably supported on the rear surface of the base plate 1 by the shaft 1b and integrally connected to the supporting arm 4 by the pin 4a, which is passed through an arcuate slot 1e formed in the base plate 1, said actuating lever 16 having a hook portion 16a. Numeral 17 designates an actuating spring which biases the actuating lever 16 counterclockwise at the position shown in FIG. 5. Numeral 18 designates a lock lever rotatably mounted to the rear surface on the base plate 1 and having a bent portion 18a which is engageable with the hook portion 16a of the actuating lever 16 in the cocked state of the shutter. Numeral 19 designates an actuating lever rotatably supported on the rear surface of the base plate 1 by the shaft 1d and integrally connected to the supporting arm 7 by the pin 7a, which is passed through an arcuate slot 1f formed in the base plate 1, said actuating lever 19 having a hook portion 19a. Numeral 20 designates an actuating spring which biases the actuating lever 19 counterclockwise at the position shown in FIG. 5. Numeral 21 designates a lock lever rotatably mounted on the rear surface of the base plate 1 and having a bent portion 21a which is engageable with the hook portion 19a of the actuating lever 19 in the cocked state of the shutter.

Figure 1:
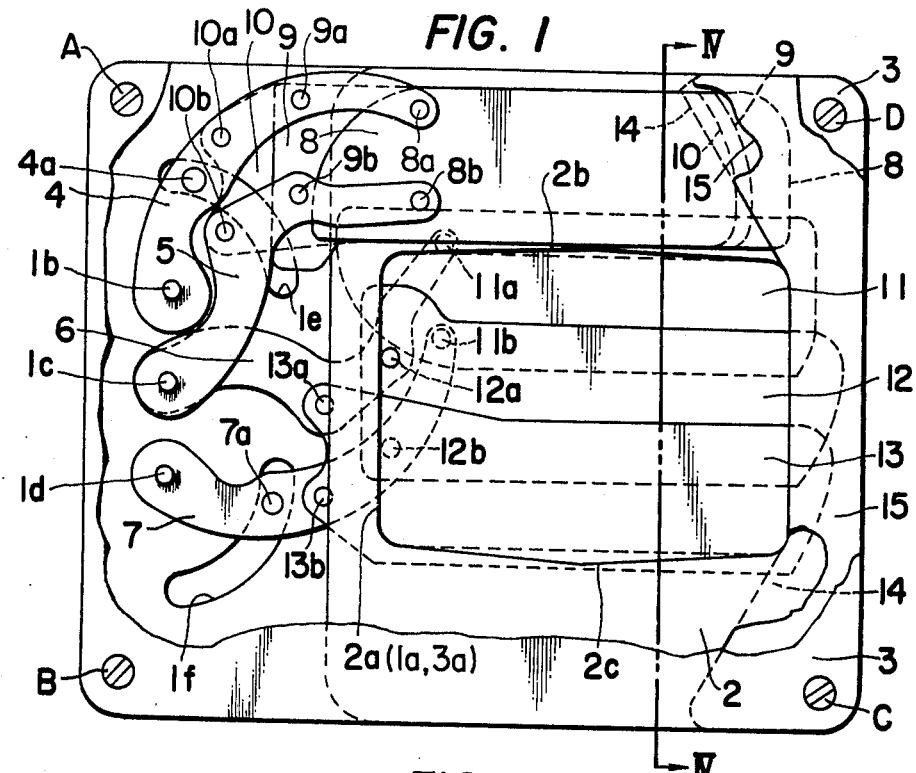
FIG. 1 shows a partially broken plan view of the important portion of an embodiment of the focal plane shutter according to the present invention in the cocked state.
Figure 2:
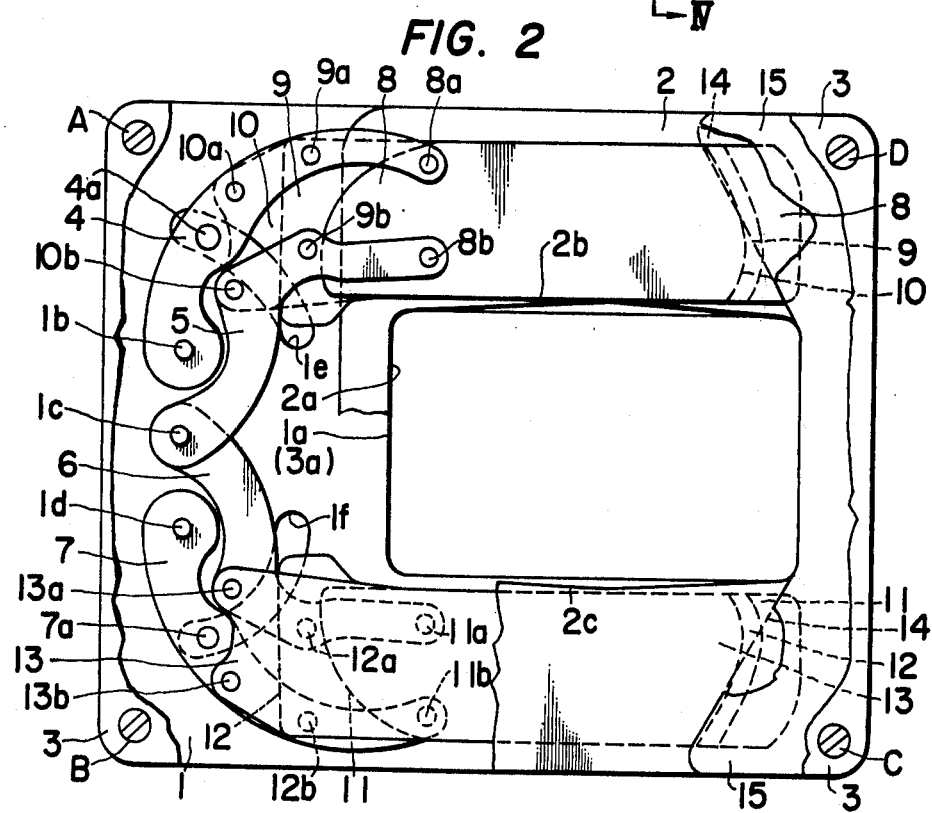
FIG. 2 shows a plan view of the main portion similar to FIG. 1, but said embodiment being in the full opened state.
Figure 3:
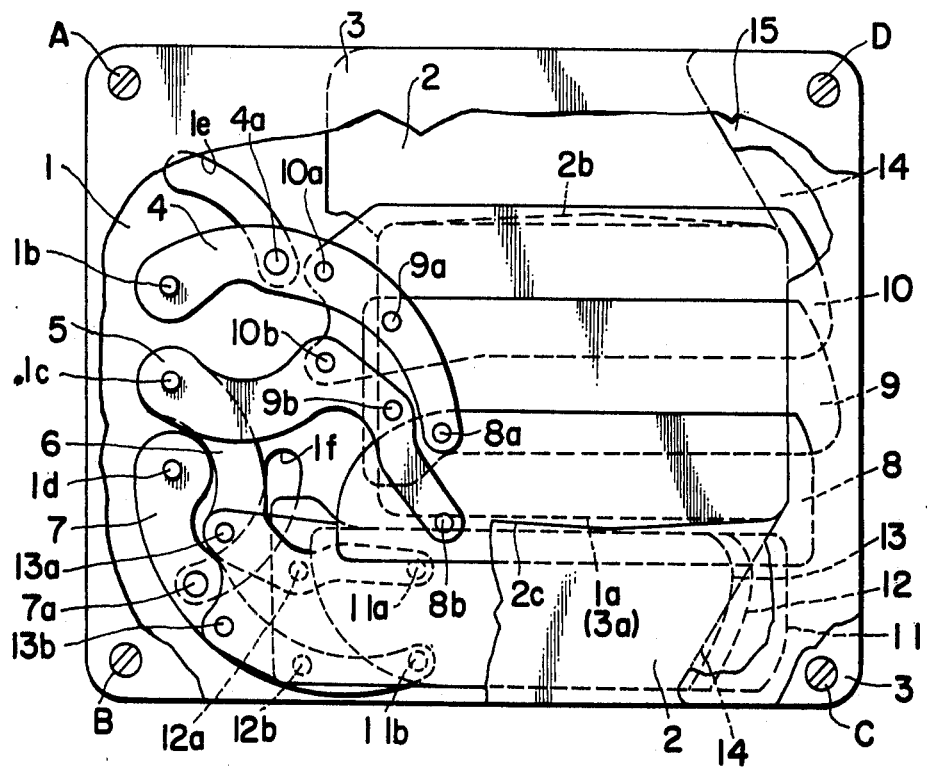
FIG. 3 shows a plan view of the main portion similar to FIG. 1, but said embodiment being in the uncocked state.

Now, the operation of the shutter according to the present invention, i.e., the operation from the cocked state shown in FIG. 1 to the uncocked state shown in FIG. 3 through the full opened state shown in FIG. 2, is described below. When the lock lever 21 in FIG. 5 is first turned clockwise by a releasing member which is not illustrated, supporting arms 6 and 7 are turned clockwise from positions shown in FIG. 1 by means of the spring 20. As the distance between shafts 1c and 1d and distance between pins 11a and 11b of said arms 6 and 7 do not change, the main thin plate 11 moves downward in FIG. 1 along loci drawn by pins 11a and 11b of said arms 6 and 7 keeping the same posture and retracts from the apertures (1a, 2a and 3a). Thin plates 12 and 13 also move downward in the same way. As, however, moving strokes of thin plates 12 and 13 are shorter than the moving stroke of the main thin plate 11, their moving speeds are slower. When the main thin plate 11 completely clears off the exposure aperture 1a, thin plates 11, 12 and 13 are approximately put one upon another as shown in FIG. 2. As respective left end portions of said thin plates 11, 12 and 13 are formed so that said left end portions will not interfere with loci of pivot pins 12a and 12b and of pivot pins 13a and 13b, said pivot pins and thin plates do not collide with each other at the time of the above movement. When the lock lever 18 is turned clockwise in the position shown in FIG. 5 after the opening shutter blades O reaches the state shown in FIG. 2 moving from the state shown in FIG. 1 as described in the above or when the opening shutter blades O are still covering the exposure aperture 1a partially, supporting arms 4 and 5 are turned clockwise in the position shown in FIG. 1 by means of the spring 17, the closing shutter blades S cover the aperture 1a (FIG. 3) instead of the opening shutter blades O, thus one exposure is completed. As it is evident from the above description, an exposure slit is formed by the upper edge of the main thin plate 11 and lower edge of the main thin plate 8 in case when the closing shutter blades S start their movement at the time when the opening shutter blades O are still covering the aperture 1a partially. The exposure time is decided by the time from the moment when the opening shutter blades O start to the moment when the closing shutter blades start. When the lower edge of the main thin plate 8 crosses the shallow V-shaped edge 2c of the partition plate 2 at the final stage of operation of the closing shutter blades S, it is so arranged that said lower edge first contacts said V-shaped edge 2c by both end portions of said V-shaped edge 2c. After that, contact points move toward the pointed portion of the V-shaped edge and both contact points finally coincide with each other at the pointed portion of the V-shape. Therefore, the main thin plate 8 will never jam with the partition plate 2 and the closing shutter blades S can be moved quite smoothly. Besides, the main thin plate 8 of the closing shutter blades S is separated from the partition plate 2 by thin plates 9 and 10 and the free end of the main thin plate 8 is in the larger end portion of the wedge-like space formed by the retaining plate 15 and partition plate 2. After starting respective thin plates 8, 9 and 10 move toward the smaller end portion of said wedge-like space by reducing the amount of overlapping of plates, thus the main thin plate 8 moves to said smaller end of the wedge-like space. Therefore, respective thin plates 8, 9 and 10 extend smoothly guided by said wedge-like space and do not bounce in the direction perpendicular to the moving direction of said thin plates. Consequently, no leakage of light occurs when said thin plates cover the exposure aperture 1a. The opening shutter blades O also has the above mentioned advantage.

Cocking operation of the shutter is carried out by turning actuating levers 16 and 19 clockwise in FIG. 5 at the same time by means of a cocking means which is not illustrated and, in the final stage of cocking operation, the actuating lever 16 is locked by the lock lever 18 and the actuating lever 19 is locked by the lock lever 21 in their cocked positions respectively. At that time, supporting arms 4, 5, 6 and 7 are simultaneously turned counterclockwise from positions shown by FIG. 3 and, therefore, respective main thin plates 8 and 11 are moved by keeping a pre-determined amount of overlapping constantly. Consequently, the aperture 1a is not opened. Besides, at that time, the upper edge of the main thin plate 11 moves smoothly without jamming with the partition plate 2 because the shallow V-shaped edge 2b exists and moves in the wedge-like space formed by the partition plate 2 and retaining plate 14. Therefore, the shutter again reaches the state shown in FIG. 1 again without causing leakage of light.

In the above description referring to the preferred embodiment, the opening shutter blades O and closing shutter blades S are respectively arranged by three pieces each of opaque thin plates. These shutter blades may be arranged by two pieces each or each four or more pieces of thin plates. Said alterations of number of thin plates may be generally understood to be included in ranges of attendant claims.

I claim:

1. A focal plane shutter for cameras including opening and closing shutter blades, said shutter comprising:
   a base plate having an exposure aperture therein, said exposure aperture having opposed long side edges and short side edges,
   a first and second pair of supporting arms each pivoted with one end thereof on said base plate at one side of said short side edges of said exposure aperture,
   two main opaque thin plates each having an end edge for forming an exposure slit parallel with said long side edges of said exposure aperture, said opaque thin plates each being directly pivoted on respective free ends of said supporting arms, said opaque plates each having a side portion thereof near pivoting points of said supporting arms, at least two auxiliary opaque thin plates positioned proximate each main thin opaque plate for covering said exposure aperture, said auxiliary opaque thin plates each being directly pivoted on said supporting arms at positions closer to said pivoting points of said supporting arms than said main opaque plates, each of said auxiliary opaque plates having a side portion thereof near said pivoting points of said supporting arms, said auxiliary opaque thin plates being positioned one upon another on each of said main opaque thin plates and being arranged to move parallel with the associated main thin plate.

2. A focal plane shutter for cameras including opening and closing shutter blades, said shutter comprising:

a base plate having an exposure aperture therein, said exposure aperture having opposed long side edges and short side edges, a first and second pair of supporting arms each pivoted with one end thereof on said base plate at one side of said short side edges of said exposure aperture, two main opaque thin plates each having an end edge for forming an exposure slit parallel with said long side edges of said exposure aperture, said opaque thin plates each being directly pivoted on respective free ends of said supporting arms, said opaque plates each having a side portion thereof near pivoting points of said supporting arms, at least two auxiliary opaque thin plates positioned proximate each main thin opaque plate for covering said exposure aperture, said auxiliary opaque thin plates each being directly pivoted on said supporting arms at positions closer to said pivoting points of said supporting arms than said main opaque plates, each of said auxiliary opaque plates having a side portion thereof near said pivoting points of said supporting arms, said auxiliary opaque thin plates being positioned one upon another on each of said main opaque thin plates and being arranged to move parallel with the associated main thin plate, and a partition plate having an aperture aligned with said exposure aperture, said opening shutter blades and said closing shutter blades being separated from each other by said partition plate, said partition plate having a pair of shallow V-shaped cut-off portions respectively formed along opposing sides of said aperture.

3. A focal plane shutter for cameras including opening and closing shutter blades, said shutter comprising:

a base plate having an exposure aperture therein, said exposure aperture having opposed long side edges and short side edges, a first and second pair of supporting arms each pivoted with one end thereof on said base plate at one side of said short side edges of said exposure aperture, two main opaque thin plates each having an end edge for forming an exposure slit parallel with said long side edges of said exposure aperture, said opaque thin plates each being directly pivoted on respective free ends of said supporting arms, said opaque plates each having a side portion thereof near pivoting points of said supporting arms, at least two auxiliary opaque thin plates positioned proximate each main thin opaque plate for covering said exposure aperture, said auxiliary opaque thin plates each being directly pivoted on said supporting arms at positions closer to said pivoting points of said supporting arms than said main opaque plates, each of said auxiliary opaque plates having a side portion thereof near said pivoting points of said supporting arms, said auxiliary opaque thin plates being positioned one upon another on each of said main opaque thin plates and being arranged to move parallel with the associated main thin plate, and a partition plate having an aperture aligned with said exposure aperture, said opening shutter blades and closing shutter blades being separated from each other by said partition plate, a pair of retaining plates mounted on both sides of said partition plate, said retaining plates being inclined with respect to said partition plate in order to form therebetween spaces for respectively housing free end portions of said opening and closing shutter blades, said spaces being relatively small in the portion thereof occupied by said main thin plates when said shutter blades are extended to cover said exposure aperture and being relatively large at the portion thereof occupied by said main plates when said shutter blades are retracted away from said exposure aperture.

* * * * *